Oct. 10, 1961  O. C. CALKINS  3,003,789
UNIVERSAL HILLSIDE HYDRAULIC HITCH
Filed March 11, 1960  3 Sheets-Sheet 1

INVENTOR.
OSCAR C. CALKINS
BY
ATTY.

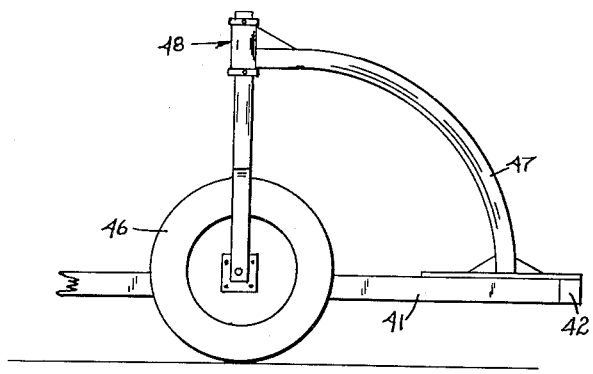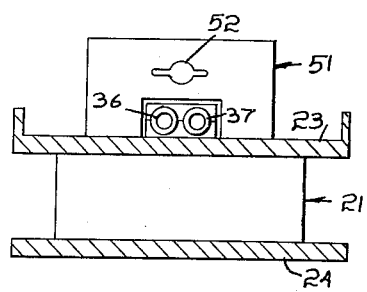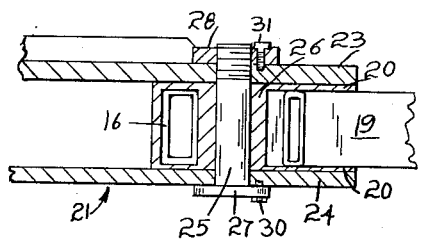

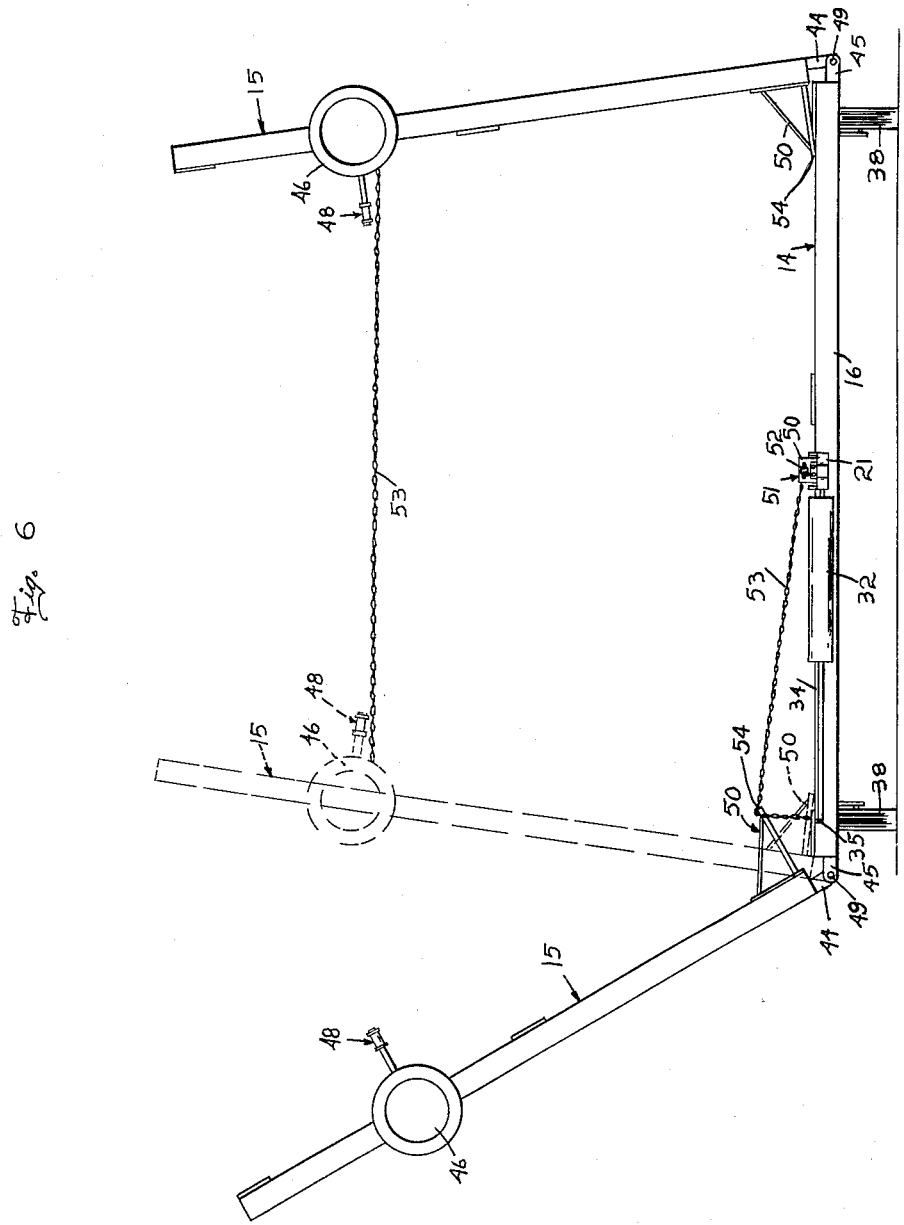

3,003,789
UNIVERSAL HILLSIDE HYDRAULIC HITCH
Oscar C. Calkins, Spokane, Wash., assignor to Calkins Manufacturing Company, Spokane, Wash.
Filed Mar. 11, 1960, Ser. No. 14,451
5 Claims. (Cl. 280—411)

This invention relates to a universal hillside hydraulic hitch for pulling farm implements behind a tractor.

A common problem in using farm implements along a hillside is the tendency of the implements to swing downhill. This is normally detrimental to effective use of the drawn implements, which are designed for level use. In the present invention this problem is solved by the use of a hydraulically adjustable tongue on the hitch for the implements. By pivoting the tongue and aiming the tractor in an uphill direction the implements may be pulled along the hillside with the hitch being maintained perpendicular with respect to its direction of travel.

It is a first object of this invention to present an adjustable hitch which is easily controlled by a single hydraulic cylinder. It is a further object of the invention to utilize this hydraulically operated tongue as a lifting jack to pivot the outer wings of the hitch to their transporting position for road travel.

These and still further objects will be evident from a study of the detailed description which follows, plus the attached drawings. This description of one preferred embodiment of the invention is not exhaustive of its possibilities, but is merely illustrative.

In the drawings:

FIGURE 3 is an enlarged fragmentary end view of a wing-supporting wheel assembly;

FIGURE 4 is a sectional view taken along line 4—4 in FIGURE 2;

FIGURE 5 is a fragmentary sectional view taken along line 5—5 in FIGURE 2; and

FIGURE 6 is a front view of the hitch illustrating the operation of the tongue in lifting the wings for transport.

Figure 1:
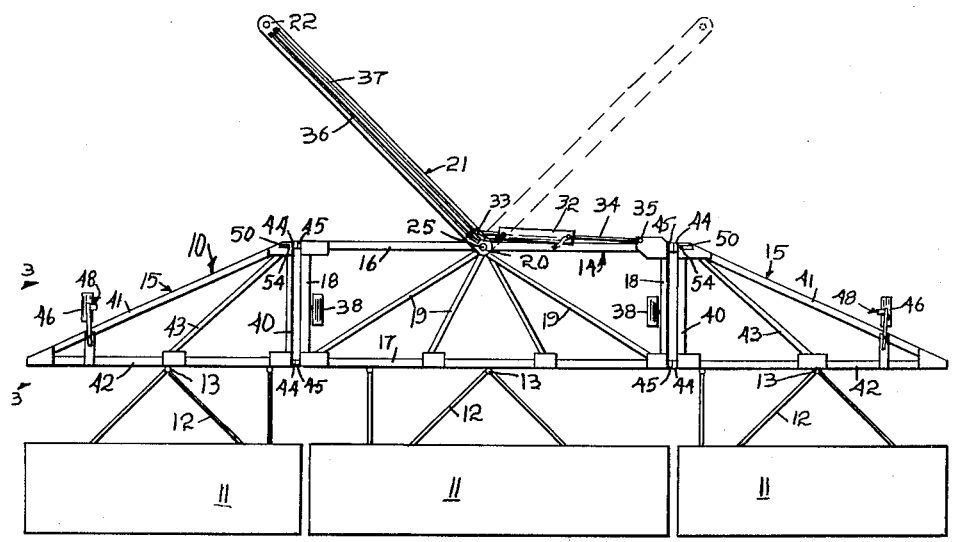
FIGURE 1 is a top plan view of the invention with an alternate position of the tongue being shown in broken lines.
Figure 2:
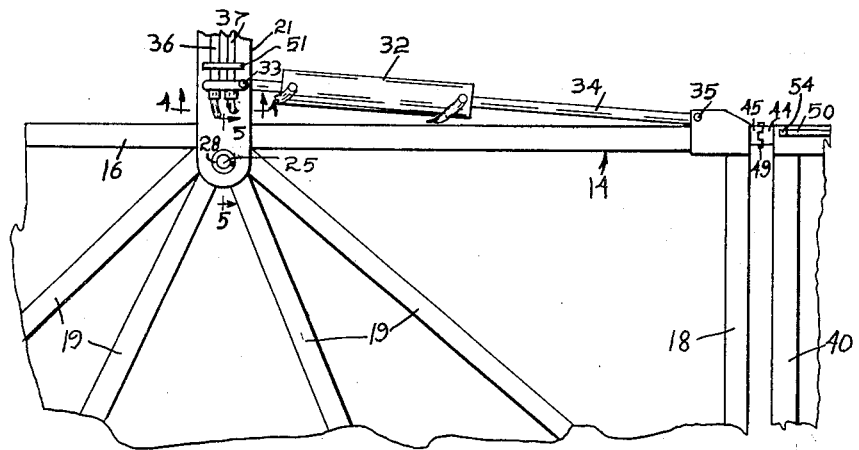
FIGURE 2 is an enlarged fragmentary view of the pivot and hydraulic cylinder connections for the operation of the tongue.

The drawings illustrate the application of this invention to a hitch designed for hillside work. The hitch is generally designated as 10. It is shown in FIGURE 1 with three farm implements 11 being towed by means of struts 12 which are pivoted at 13 to the rear end of hitch 10. The implements 11 may be of any desired type and may include deep furrow drills, weeders or skew treaders—all of which must be towed along the hillside without any diagonal deviation.

The hitch 10 consists of a central horizontal frame 14 plus two wings 15 which are formed as mirror images of one another and which are pivoted to the central horizontal frame 14 for movement about a horizontal axis located between each side end of frame 14 and the adjacent wing 15. The frame 14 consists of a forward member 16, a rear member 17 and two side members 18 which are rigidly connected to form a rectangular frame as shown. All the frame members 16–18 are formed of suitable channel or bar stock for adequate strength. Additional supporting bars 19 are rigidly connected between points located along the rear member 17 and the center of forward member 16 to provide bracing strength to frame 14 for towing the farm implements.

Mounted on the upper and lower surfaces of the forward member 16 and supporting bars 19 are two flat pivot mounting plates 20 which provide bearing surfaces for the pivoted tongue 21. Tongue 21 extends forwardly of the hitch 10 and is formed of suitable heavy bar stock. The forward end of tongue 21 has an aperture 22 adapted to receive a king pin for attachment to a tractor. The rear end of tongue 21 is bifurcated to form a yoke having upper and lower plates 23 and 24. A pivot ball 25 passes through apertures cut through plates 23, 24 and 20. A suitable bearing collar 26 surrounds bolt 25 between plates 20 (See FIGURE 5), and the head 27 and nut 28 of bolt 25 are fixed to the plates 24 and 23 by means of set screws 30 and 31 respectively. This arrangement allows for wide pivotal movement of tongue 21 in a horizontal plane.

The mechanism by which tongue 21 is moved consists of a double-acting hydraulic cylinder 32 which is pivotally anchored to tongue 21 by means of a pin 33. The piston rod 34 is pivotally joined to the forward member 16 at one of the side ends by means of a pin 35. The cylinder 32 is controlled by means of two hydraulic lines 36, 37 which extend along the upper surface of tongue 21. The lines 36, 37 are connected to controls mounted on the tractor unit. Since such controls vary widely and are quite common, further discussion of their structure will not be offered herein.

The central horizontal frame 14 is carried along the ground by two wheels 38 which are mounted in any desired manner upon the side members 18. The wheels 38 may be adjustable in height if this is desired.

The wings 15 each consist of a side bar 40 to which are connected a rearwardly directed bar 41 and a rear bar 42 which is aligned with the rear member 17 of central frame 14. These three bars 40, 41 and 42 constitute a triangular frame. A supporting strut 43 connects the junction of bars 40 and 41 to the center of rear bar 42. The side bars 40 are pivotally joined to the side members 18 by means of ears 44 extending from side bars 40 and ears 45 extending from side members 18. The ears 44 and 45 are pivotally joined by means of bolts 49.

The outer ends of wings 15 are supported by wheels 46 which are mounted forward of the wings to balance the tapered effect of the wing frames. A curved support 47 is secured to bars 41 and 42 and pivotally carries a wheel mounting unit 48. The wheels 46 are free to pivot so as to facilitate turning, and are maintained in a slightly forward position with respect to the wheels 38 so as to allow hitch 10 to pivot about the radius between wheels 38, while lending stability to the unit to resist tipping about the wheels 38.

A hitch 10 such as shown must be extremely wide for use in a field, but must fold for transporting along highways, which subject vehicles to width restrictions. In order to pivot wings 15 upwardly, considerable force is required due to their bulk and weight. According to this invention, the hydraulic cylinder 32 is utilized as a power unit to raise each wing 15.

The side bar 40 of each wing has fixed to it a perpendicular upwardly extending support 50 which is apertured at its top 54 so as to allow a chain to be hooked upon it. The tongue 21 is provided with a yoke 51 mounted forward of its pivot and similarly apertured at 52 to receive a chain. From FIGURE 6 it can be seen that each wing 15 may be raised by hydraulic pressure using a single length of chain 53. Tongue 21 is released from the tractor. Chain 53 is first hooked between top 54 of the support 50 on one wing and yoke 51 after tongue 21 has been pivoted toward the wing 15 by means of cylinder 32. Movement of tongue 21 away from the wing 15 will then pivot the wing about bolt 49 until the wing falls over-center due to the offset position of the support 50. The process can then be repeated for the remaining wing 15, using the same chain 53. After both wings 15 are in their upward position, chain 53 can be used to join them near their ends to prevent the wings from falling. After transporting, the wings 15 may be lowered to their operational positions by reversing these steps.

The hitch is capable of pulling farm implements at any point along member 17 or bars 42, since the cylinder 32 will maintain them in the desired plane regardless of the side slope encountered. As the slope increases, cylinder 32 is used to pivot tongue 21 to compensate for the tendency of the hitch 10 to pivot downhill. The tongue and hitch combination provide a simple means of obtaining efficient operation of the drawn implements under all conditions, while also providing simple means for raising wings 15 for road transport.

Various modifications may present themselves to one skilled in this art without substantially changing the basic concepts contained herein. Therefore, the invention is not to be limited by the specific details enumerated above for illustrative purposes. The true scope of the invention is defined only in the annexed set of claims.

Having thus described my invention, I claim:

1. In a hitch adapted to tow farm implement units behind a tractor unit, a horizontal frame, ground engaging support means mounted upon said frame, a tongue extending forwardly from said frame and pivotally connected at one end to the frame about a vertical axis, the remaining end of said tongue being adapted for connection to a tractor unit, a wing extending from one side of said frame, said wing being pivotally joined to the frame for rotational movement about a horizontal axis, first support means fixed to said wing at a point offset from its pivotal axis and protruding vertically therefrom, second support means fixed to the tongue intermediate its ends, support means at a pivot vertically removed from the wing axis, to said means adapted to connect said first and second support means whereby movement of the tongue will result in pivotal movement of said wing about its connection to the frame.

2. In a hitch adapted to tow farm implement units behind a tractor unit, a horizontal frame, ground engaging support means mounted upon said frame, a tongue extending forwardly from said frame and pivotally connected at one of its ends to the frame for rotational movement about a vertical axis, the remaining end of said tongue being adapted for connection to a tractor unit, a wing extending from each side of said frame, each of said wings being pivotally joined to the frame for rotational movement about a horizontal axis, a vertical extension fixed to each of said wings and laterally displaced with respect to the joinder of the respective wing and the frame, and means adapted to individually connect said vertical extensions to the tongue intermediate the ends of the tongue, whereby pivotal movement of the tongue with respect to the frame will cause the wings to be pivoted upwardly about their pivotal connections to the frame.

3. In a hitch adapted to tow farm implement units behind a tractor unit, a central frame mounted on ground engaging wheels, a tongue having one end adapted to be connected to a tractor unit and having its remaining end pivoted to the central frame about a vertical axis, extensible power means pivotally connected between said central frame and the tongue, said central frame, tongue and power means being located in a common plane relationship, said power means being adapted to position said tongue with respect to the frame, wing means pivoted to the end portion of the central frame for movement about an axis parallel to the central frame, said wing means including a vertical extension offset from its pivotal axis, and means adapted to selectively join said vertical extension and the tongue whereby movement of the tongue will cause the wing means to be pivoted upwardly with respect to the frame.

4. In a hitch adapted to tow farm implement units behind a tractor unit, a rigid central towing frame structure, ground engaging wheels rotatably mounted upon said central towing frame, rigid side towing frames pivotally connected to each side of said central towing frame for pivotal movement about an axis parallel to the central towing frame, ground engaging wheel means carried by each of said side towing frames, a tongue extending forwardly of the central towing frame and pivotally joined thereto about a vertical axis, hydraulic power means pivotally connected between said tongue and said central towing means adapted to position said tongue about said vertical axis, each of said side towing frames including an upwardly directed vertical extension mounted thereon at a point offset from the pivotal connection of the respective side towing frame and the central towing frame, and chain means adapted to be selectively connected between each of said vertical extensions and said tongue, whereby pivotal movement of said tongue will result in upward pivotal movement of the respective side towing frames.

5. The device as defined in claim 4 wherein said vertical extensions are adapted to limit pivotal movement of their respective side towing frames to a position over-center from their towing positions, the offset of the extensions from the pivotal connections of the side and central towing frames being less than the height of the extensions above the side towing frames.

References Cited in the file of this patent

UNITED STATES PATENTS

| | | |
|---|---|---|
| 1,190,683 | Stroud | July 11, 1916 |
| 1,535,058 | Taylor | Apr. 21, 1925 |
| 1,963,426 | Taylor | June 19, 1934 |
| 2,610,562 | Ward | Sept. 16, 1952 |
| 2,828,680 | Johnson | Apr. 1, 1958 |